United States Patent [19]

Martino et al.

[11] 4,292,663
[45] Sep. 29, 1981

[54] HIGH INTENSITY ILLUMINATION LIGHT TABLE

[75] Inventors: Ronald J. Martino, Geneva; Alfred L. Shawcross, Lima, both of N.Y.

[73] Assignee: Bausch & Lomb Incorporated, Rochester, N.Y.

[21] Appl. No.: 74,276

[22] Filed: Sep. 11, 1979

Related U.S. Application Data

[62] Division of Ser. No. 869,968, Jan. 6, 1978, Pat. No. 4,220,982.

[51] Int. Cl.³ ............................................. G09F 13/04
[52] U.S. Cl. ..................................... 362/97; 362/297; 362/307; 362/311
[58] Field of Search ................... 362/97, 297, 307, 311

[56] References Cited

U.S. PATENT DOCUMENTS

| | | | |
|---|---|---|---|
| 2,701,838 | 2/1955 | Loesch | 362/33 |
| 3,463,914 | 8/1969 | Lutter | 362/33 |

Primary Examiner—Stephen J. Lechert, Jr.
Attorney, Agent, or Firm—Frank C. Parker; DeWitt M. Morgan

[57] ABSTRACT

A stereo viewing system including a stereomicroscope, a film advance system and a high intensity illumination light table. The stereomicroscope includes rhomboid arms for positioning the optics over the film to be viewed. The light table includes a light transmitting cover, and a pair of intersecting reflectors, a pair of lamp assemblies and a diffuser, all combined to produce a diffused pair of intersecting annular rings of illumination. Each reflector is a section of a surface of revolution, preferably a section of a paraboloid. The lamp assemblies are mounted relative to the reflectors so that the filament of each lamp is, at least nominally, at the focal point of each parabolic reflector. The diffuser is, preferably, a pair of cylindrical shaped elements each of which is located between a lamp and its respective reflector and surrounds each lamp. The light table also includes a pair of mechanical dimmers and a cooling system.

13 Claims, 8 Drawing Figures

HIGH INTENSITY ILLUMINATION LIGHT TABLE

This is a division of application Ser. No. 869,968, filed Jan. 16, 1978 now U.S. Pat. No. 4,220,982.

DESCRIPTION OF THE PRIOR ART

The analysis of aerial photography typically involves the viewing of stereo photographs with optical instruments which incorporate stereomicroscope optical systems. Such stereomicroscopes usually include continuously variable magnification systems and rhomboid arms to position the optics over the images to be viewed. Typically, the photographs are transilluminated by supporting them on a light table having a film support surface and an illumination system positioned below the film support surface. Such a system may, generally speaking, be classified as a microscope bright field (as opposed to dark field) illumination system.

Bright field microscope illumination systems must fulfill two requirements if they are to satisfy the designed resolving power and field of view of a stereomicroscope: namely, fill the numerical aperture (NA) of the objective lens and fill the field of view of the optical system, both of which are variable in optical systems having continuously variable magnification. In addition to satisfying the foregoing conditions, the use of rhomboid arms requires either an extended illuminated area or a tracking illumination system which remains in alignment with the viewing optics as the position of one or both rhomboid arms is changed.

Tracking illumination requires the use of either servo controlled or slave microscope type illumination systems which are complicated, bulky and expensive. Thus, typically, both the changing NA and field coverage problems are solved by utilizing a large, extended and relatively low intensity diffused source below the film support surface. Cold cathode tubes or conventional fluorescent lamps arranged below a plastic diffusing surface are the universal solution. The diffusion which results assures that the NA condition is fulfilled. The large size of the source assures that the field of view and movable rhomboid alignment conditions are also satisfied. However, these systems are limited to film plane brightnesses of about 5,000 ft-lamberts. Also, operation requires relatively high current.

In view of the fact that the stereomicroscopes used for photogrammetric applications require, in many instances, the use of beam splitting optics (with the associated 50% or so light loss), complex lens systems (with light losses due to absorption and reflection), high magnifications (with resultant small exit pupils) and in view of the use of dense photographs, 5,000 ft-lambert illumination levels are marginal and often inadequate.

The ring illumination system of the present invention resolves the foregoing problems by providing illumination levels on the order of 50,000 to 200,000 ft.-lamberts. Further, such systems require only, approximately, one-third of the current that conventional cold cathode light tables require.

SUMMARY OF THE INVENTION

A high intensity illumination light table for transilluminating film including a housing or support structure having a light transmitting cover. Positioned within the housing is apparatus for producing a diffused annular ring of illumination. The apparatus includes a source of high intensity illumination, a reflector in the form of a surface of revolution for producing an annular image of the source, and a diffuser. Preferably, the reflector is a section of a paraboloid. The diffuser is located between the source and the light transmitting cover and is, preferably, a cylinder positioned between the reflector and the source and surrounding the source. The light table also includes a mechanism for dimming the source and, preferably, a cooling system. Further, the apparatus for producing the diffused annular ring is mounted in pairs to produce a diffused pair of intersecting annular rings of illumination.

DESCRIPTION OF THE PREFERRED EMBODIMENT

Figure 1:
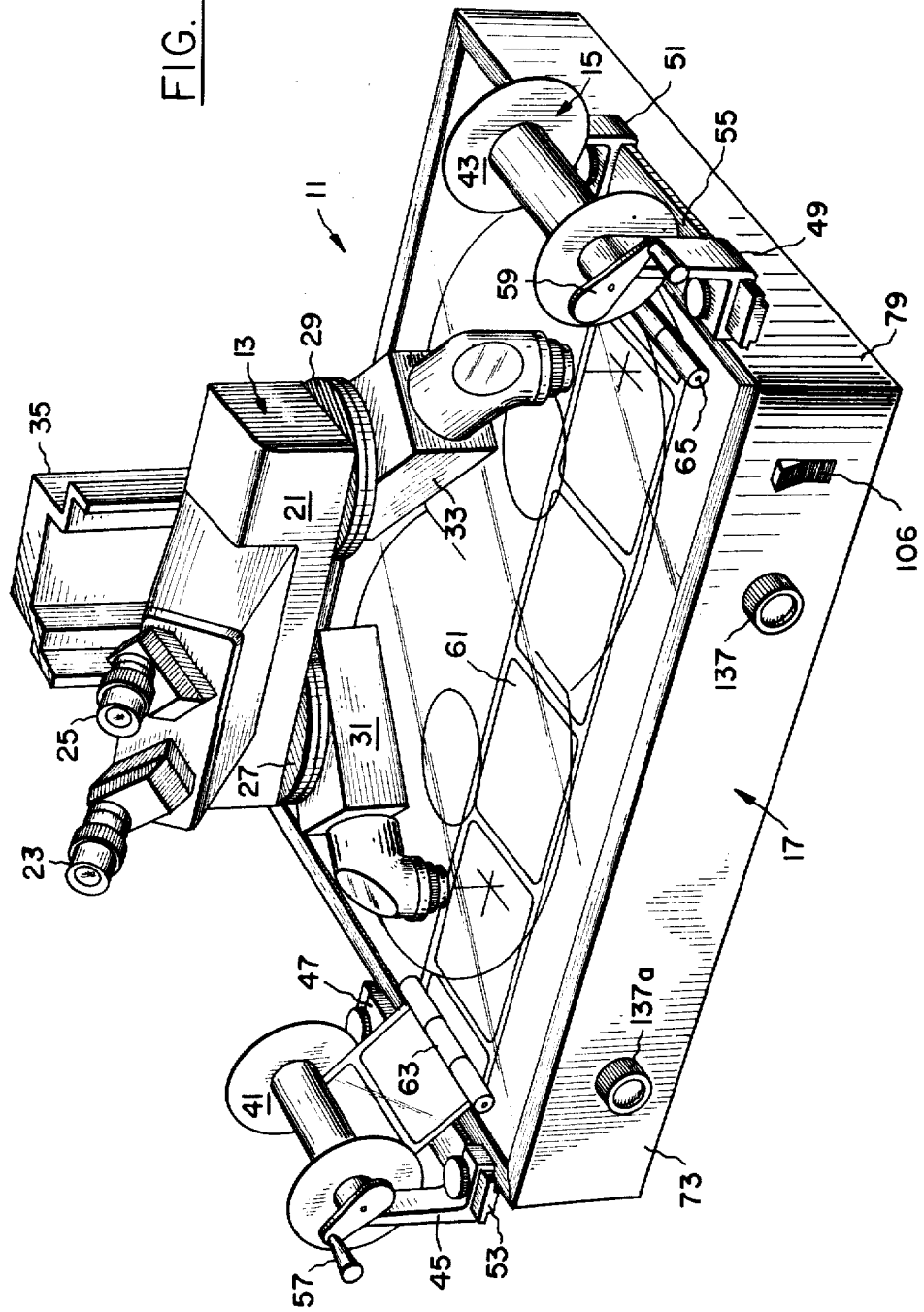
FIG. 1 is a perspective view of the stereo viewing system embodying the principals of the present invention.

The stereo viewing system 11 illustrated in FIG. 1 includes a stereomicroscope 13, film advance system 15 and a high intensity illumination light table 17.

Stereomicroscope 13 includes a housing 21 on which are rotatably supported eyepiece assemblies 23 and 25 which vary the interpupiliary distance, as is well known in the art. Also rotatably supported on housing 21, via bearing assemblies 27 and 29, are a pair of rhomboid arms 31 and 33. Supported within arms 31 and 33, housing 21 and eyepiece assemblies 23 and 25 is a stereo optical system (not shown), preferably of continuously variable magnification. Stereomicroscope 13 is positioned relative to light table 17 by vertical support 35. Apparatus, not shown, is also provided to vary the distance of housing 21, and hence the optical system supported therein, relative to light table 17 for focusing.

Film advance system 15 includes a pair of film sprockets 41 and 43 supported by, respectively, brackets 45, 47 and 49, 51 which are, in turn, mounted on dovetail slides 53 and 55. Sprockets 41 and 43 include, respectively, crank handles 47 and 59 to advance or retract film 61. As illustrated, slides 53 and 55 are secured to light table 17 in a conventional manner (not shown). However, those skilled in the art will appreciate that film advance system 15 would normally be attached to a conventional film scanning stage which, in turn, would be secured to light table 17. To simplify the drawings the film scanning stage has been omitted. Finally, system 15 also includes a pair of hold-down rollers 63 and 65 which retain film 61 in proximity to the focal plane of stereomicroscope 13. Typically, rollers 63 and 65 are secured by brackets (not shown) to a film scanning stage (also not shown).

Light table 17 includes a housing 71 having front panel 73, rear panel 75, side panels 77 and 79 and a base or bottom panel 81. Housing 71 also includes a cover 83 which protects the structure supported within housing 71 and, typically, supports a film scanning stage (not shown). As illustrated, in the absence of a film scanning stage, top surface 85 functions as the film support surface. Cover 83 is, preferably, made of clear glass.

Positioned within housing 71 are a pair of illumination systems 87 and 87a. System 87, which is the mirror image of system 87a, includes a reflector 89, a lamp assembly 91 and a mechanical dimmer mechanism generally designated 93. Reflector 89 is a section of a paraboloid having a top surface 95 and a central opening 97. To avoid asymmetry, reflectors 89 and 89a are centered about, respectively, the pivot axes of rhomboid arms 31 and 33 and intersect each other along seam 99. Finally, reflector 89 has a reflective coating on its interior surface 100. The coating may be of evaporated aluminum. However, to control the heat of cover 83 and, hence, the temperature of film 61, a multi-layer film which transmits infra-red radiation while reflecting visible light, is preferred.

Lamp assembly 91 includes a base or sprocket support 101 and a lamp 103. Lamp 103, which is, preferably, a quartz halogen tungsten source including a filament 104 and an envelope 105 is supported by base 101 so that the center of filament 104 is, nominally, at the center of focus of reflector 89. Alternately, a compact arc source may be utilized. While this alternate source is more compatable optically with reflector 89 and provides greater illumination than a quartz halogen tungsten source, it is more expensive to operate. Base 101 includes the necessary electrical connectors (not shown) for lamp 103 and is, in turn, electrically connected to a source of supply (also not shown). Lamp 103 is energized via control 106 mounted on panel 73 of housing 71.

Figure 3:
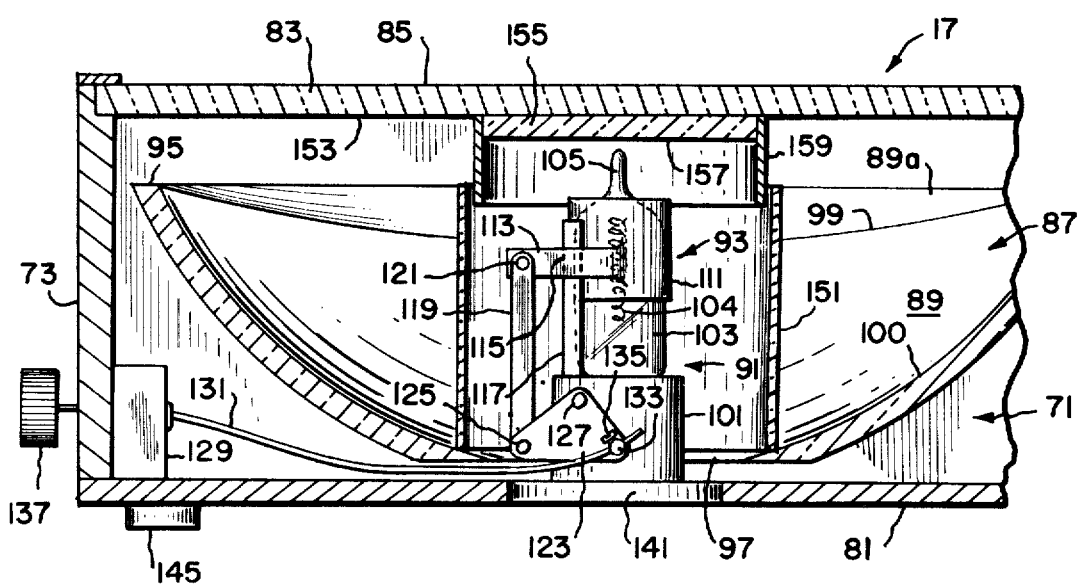
FIG. 3 is an enlarged, partially broken away, cross-sectional view of the light table taken along line 3—3 of FIG. 2.

Dimmer mechanism 93 includes a generally cylindrically shaped shield 111, having a laterally extending arm 113. Arm 113 is provided with a bore 115 which slideably receives guide pin 117 secured to base 101. The free end of arm 113 is connected to arm 119 by pin 121. The opposite end of arm 119 is connected to pivot member 123 by pin 125. Pivot member 123 is, in turn, connected to base 101 via pivot member 127. Finally, pivot member 123 is connected to dimmer actuator mechanism 129 via cable 131, pivot pin 133 and lock screw 135. Actuator 129, which is a conventional mechanism for converting rotational motion to linear motion, is operated by rotation of control 137 mounted on front panel 73. The dimmer mechanism (not illustrated) for illumination system 87a is activated by control 137a. Thus, rotation of control 137 moves cable 131 which, in turn, pivots member 123 to raise or lower shield 111. As illustrated in FIG. 3, shield 111 is in a dimming position. As those skilled in art will appreciate, lamp 103 could be dimmed electrically. However, this changes the color temperature of the illumination which, in the field of photo interpretation, is generally not desirable.

Figure 2:
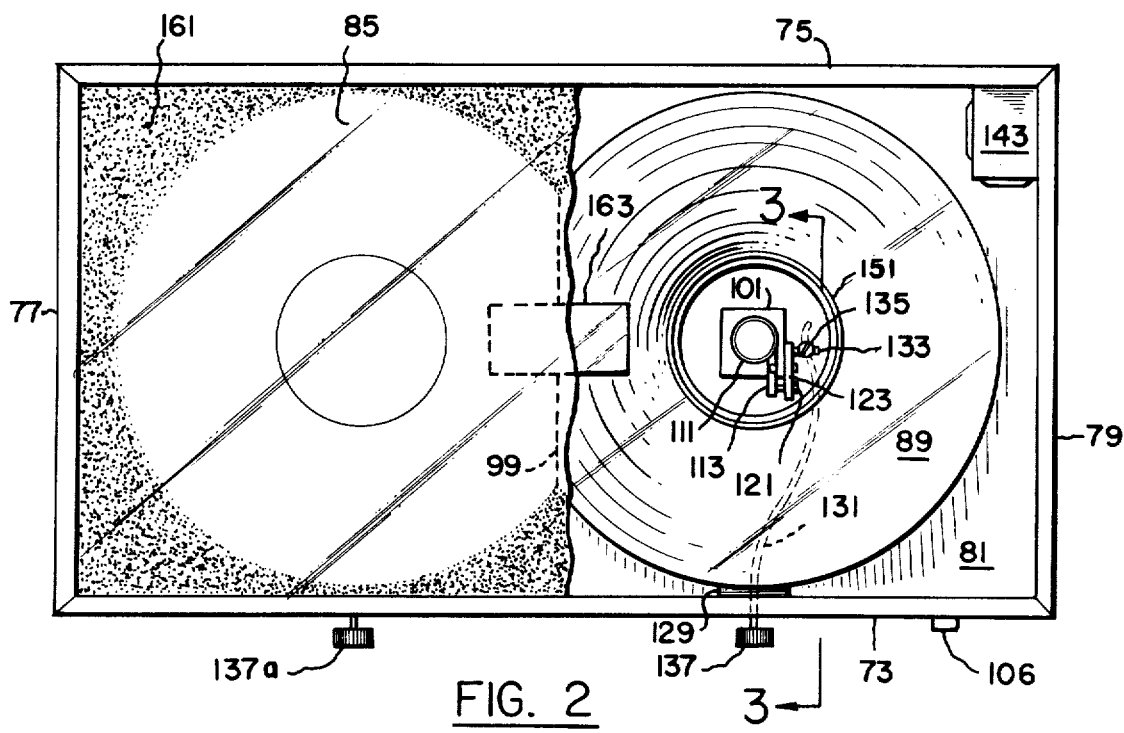
FIG. 2 is a top plan view of the high intensity illumination light table of FIG. 1 with the film advance system removed and the housing cover partially broken away.

Finally, illumination system 87 includes an opening 141 in bottom 81 to allow circulating air to enter housing 71 to cool lamp 103. An exhaust fan 143 may also be provided, as illustrated in FIG. 2, to create a negative pressure within housing 71 which allows air to be drawn through opening 141 and across lamp 103 to remove excess heat. To insure that opening 141 is not blocked, base 81 is provided with feet, such as illustrated at 145 in FIG. 3.

As previously stated, lamp 103 is mounted relative to reflector 89 so that the filament is, at least approximately, at the center of focus thereof. Accordingly, light rays from lamp 103 which strike reflector 89 are substantially collimated and projected upward toward housing cover 83. Such collimated light is highly advantageous in providing much higher illumination than obtainable in prior art fixed source illumination tables. However, if film 61 was illuminated by direct, non-diffused light from reflector 81, scratches and other defects on the film surface would be visible when viewed with stereo-microscope 13. Further, the image of the filament of lamp 103 would be visible as an annular hot spot. To eliminate these drawbacks and, at the same time make the illumination more uniform, a diffuser is provided. The exact location of the diffuser may be varied. As the diffuser is moved away from lamp 103 more uniform diffusion is obtained. However, such movement decreases the intensity of the transmitted light. Conversely, the closer the diffuser is to lamp 103, the greater the transmitted light but the less uniform the diffusion. The other variable which must be taken into consideration is the granularity of the diffusing surface. The finer the granularity the greater the light transmitted and the greater the likelihood that a hot spot will be visible. A courser surface will eliminate the hot spot but, at the same time, reduce the amount of light transmitted. In its simplest form, diffuser is in the form of a cylinder of diffused plastic inserted between lamp assembly 91 and reflector 89, as illustrated in FIGS. 2 and 3. Cylinder 151 may also be of glass to which a diffusing coating has been applied. Alternately, a diffusing coating may be applied to surface 100 of reflector 89. Finally, a diffuser may be interposed between reflector 89 and the bottom surface 153 of cover 83, provided that it is not so close to the film plane as to be within the depth of focus of the optics of stereomicroscope 13 and, thus, visible to an operator.

In addition to the light reflected off surface 100, light from lamp 103 also directly strikes cover 83. The effect, in the area directly over lamp 103 is a very hot and bright spot. To eliminate this a mirror 155 may be affixed, such as by cement, to surface 153 of cover 83 as illustrated in FIG. 3. Mirror 155 has, preferably, a semi-reflective coating 157 thereon which reflects infrared radiation from lamp 103 to keep cover 83 from getting hot yet allows, approximately, 2-4% percent light transmission through cover 83 so an operator can view film imagery in this location with the unaided eye. Mirror 155 also acts to obscure lamp assembly 91 and dimmer mechanism 93. Additionally, a cylindrical shield 159 may be positioned about mirror 155 in the manner illustrated in FIG. 3 to further reduce the amount of undiffused radiation reaching cover 83 or the eye of the operator. For cosmetic purposes the surface 85 of cover 83 may be opaqued, as indicated by 161, outside of the rings of illumination produced by systems 87 and 87a.

Figure 4:
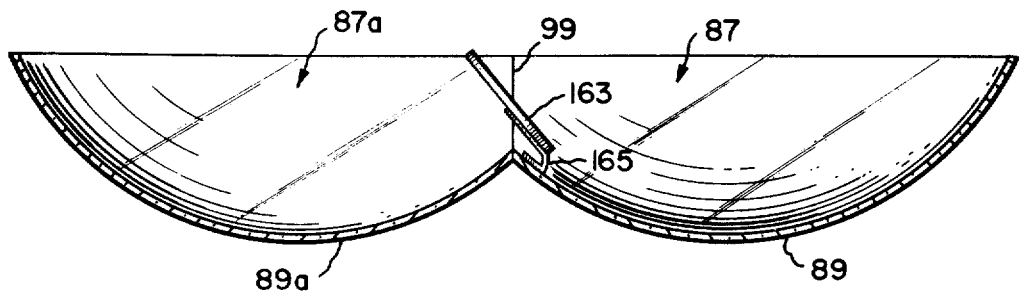
FIG. 4 is an optical schematic of the light table taken along line 4 of FIG. 2 with the housing, lamp assembly and dimmer mechanism removed.

As illustrated in FIGS. 2 and 3, reflectors 89 and 89a intersect along seam 99 which, as is evident from inspection of FIG. 1, is visible through cover 83. Typically, stereomicroscopes used in film viewing also provide for monoviewing. This may be accomplished by using the optics of only one of the rhomboid arms. However, stereomicroscopes such as the Bausch & Lomb Zoom 240 Stereoscope provide for monoviewing between the rhomboid arms. When mounted as illustrated in FIG. 1, such monoviewing would be directly over the seam 99. As illustrated in FIGS. 2 and 4, to avoid viewing seam 99 a mirror 163, secured to reflector 89 via bracket 165, is provided. Mirror 163 is angled at, approximately, 45° with respect to the vertical to receive light from lamp 103 and reflect it upwards through cover 83. In those situations where the lamps are close together and the diffusers do not completely surround the lamps it is necessary to provide a diffusing medium on the mirror. This may be accomplished by putting the reflective coating on the underside of the mirror and sand blasting the front surface.

In operation, film 61 is secured to film advance system 15 so that the individual frames thereof are situated on and across top surface 85 of cover 83, as illustrated in FIG. 1. Take-up spools 41 and 43 permit advancement of film 61 in the X direction while the scanning stage (not shown) permits movement in both the X and Y directions. Switch 105 is then actuated to energize lamp 103 and the lamp (not shown) of illumination system 87a to thereby brightly illuminate cover 83 in a figure-8 type configuration such as illustrated in FIG. 1. The vertical positioning of stereomicroscope 13 is then adjusted to bring the stereo images into focus. The operator may then look through the eyepiece assemblies 23, 25 and adjust the rhomboid arm 31 and 33 over film 61. Once the stereo images to be viewed are properly positioned and in focus, the brightness may be increased or decreased as required by merely actuating controls 137 and 137a.

Figure 5:
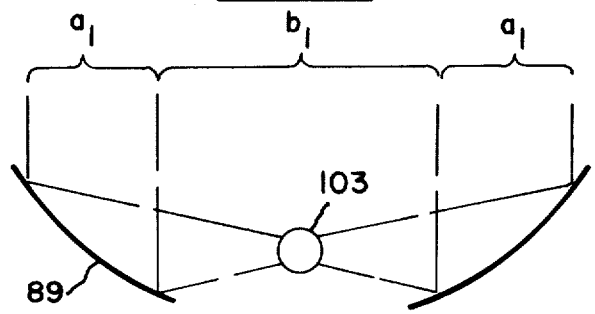
FIG. 5 is an optical schematic of the illumination system of FIGS. 2 and 3.
Figure 6:
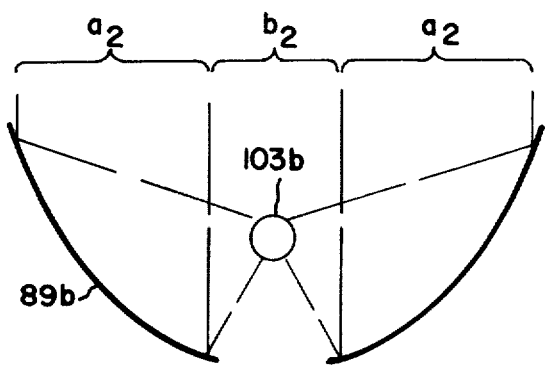

FIG. 5 is an optical schematic of the reflector 89 and lamp 103 of the embodiment of FIGS. 1–4. As reflector 89 is a fairly shallow section of a parabolic reflector, the annular ring of illumination produced has a width $a_1$ and a center section of diameter $b_1$. As those skilled in the art will appreciate, the size of the illuminated annular ring, relative to the center section will vary depending upon the depth of the section of parabolic reflector chosen. A comparison between FIG. 5 and FIG. 6 illustrates that as the depth of the reflector 89b is increased, the width $a_2$ of the annular ring of illumination produced from lamp 103b increases and the diameter of the center section $b_2$ decreases.

Figure 7:
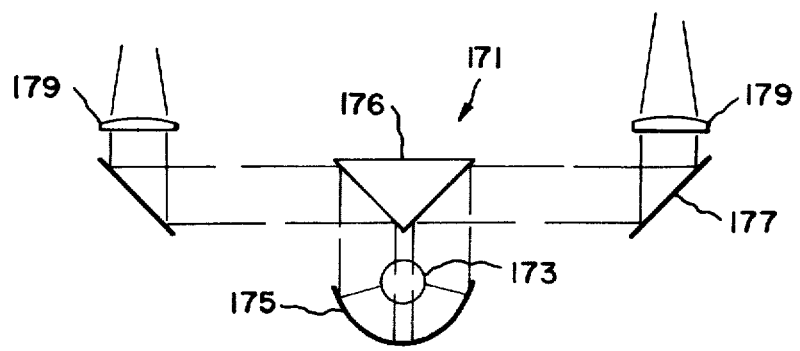

An alternate embodiment is illustrated schematically in FIG. 7. Illumination system 171 includes a light source 173, parabolic reflector 175, a plano reflecting cone of rotation 176 and a plano reflector of rotation 177. Light source 173 is positioned at the focal point of reflector 175 whereby parallel light is directed toward cone 176 which, in turn, reflects the light to reflector 177 and, hence, toward the film support surface (not shown) of the light table. System 171 may also include an annular condensing lens 179 positioned between reflector 177 and the film support plane for condensing the light reflected off reflector 177. By condensing the light from reflector 177, lens 179 is utilized to increase the image brightness for optical systems with fixed N.A.'s and fixed entrance pupils.

Figure 8:
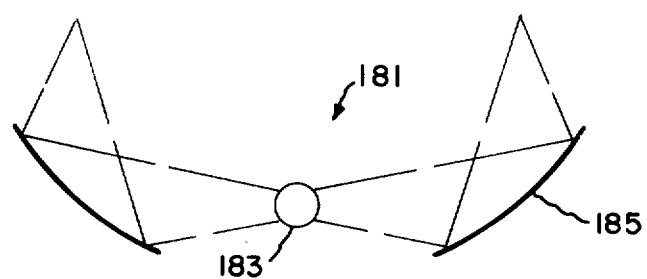
FIGS. 6-8 are optical schematics showing various alternative embodiments of the illumination system according to principles of the present invention.

Illumination system 181, illustrated in FIG. 8, includes a lamp 183 and an elliptical reflector of revolution 185. Lamp 183 is positioned at the central focal point of reflector 185 and light from lamp 183 is reflected to a second, annular focus. As with the previous embodiment, because illumination system 181 is used in conjunction with a diffuser (not shown) the light is not brought to focus but diffused to fill NA and fields of view of the viewing optics.

Whereas the drawings and accompanying description have shown and described several preferred embodiments of the present invention, it should be apparent to those skilled in the art that various changes may be made in the form of the invention without affecting the scope thereof.

I claim:

1. A high intensity light table for transilluminating film for viewing with microscope optics, said light table comprising:
   (a) housing means;
   (b) a plano light transmitting surface supported by said housing means;
   (c) means for producing in the plane of said light transmitting surface an annular ring of illumination which fills both the numerical aperture and the field of view of said microscope optics, said means including
      (i) a reflector in the form of a surface of revolution positioned within said housing means, and
      (ii) a source of high intensity illumination nominally positioned at the center of focus of said reflector whereby, when said source is energized, said reflector produces an annular image of said source;
   (d) means for diffusing said annular ring of illumination to thereby eliminate both the image of said source and the scratches and other defects on a film surface which, if illuminated by non-diffused light, would be visible when viewed through said microscope optics, said diffusing means including a diffuser, located in the light path between said source and said light transmitting surface and beyond the depth of focus of said microscope optics; and
   (e) means, connected to said housing means, for dimming said source.

2. The apparatus as set forth in claim 1, wherein said dimming means includes mechanical means, whereby said source may be dimmed without changing the color temperature of the illumination produced by said source when said source is energized.

3. The apparatus as set forth in claim 2, wherein said source includes a filament and an envelope surrounding said filament, and wherein said mechanical dimming means includes a cylindrically shaped shield for incircling at least a portion of said envelope, and a mechanism to move said shield relative to said envelope, whereby, when said shield incircles a portion of said filament, illumination from the incircled portion of said filament is prevented from reaching said reflector.

4. The apparatus as set forth in claim 3, wherein said mechanism includes an arm laterally extending from said shield and having a bore therein, a guide pin secured to said housing means and received in said bore, and a mechanical linkage secured between said arm and said housing means for moving said arm relative to said guide pin.

5. A high intensity light table for transilluminating film, said light table comprising:
   (a) housing means;
   (b) a plano light transmitting surface supported by said housing means;
   (c) means for producing in the plane of said light transmitting surface a diffused pair of intersecting annular rings of illumination, said means including
      (i) first and second intersecting reflectors, each in the form of a surface of revolution, positioned within said housing means, (ii) first and second sources of high intensity illumination, said first source nominally positioned at the center of focus of said first reflector, said second source nominally positioned at the center of focus of said second reflector whereby, when said sources are energized, said reflectors produce a pair of intersecting annular images of said sources, and (iii) diffuser means located in the light path between said sources and said light transmitting surface to diffuse said intersecting annular images of said sources when said sources are energized; and (d) means, connected to said housing means, for dimming said sources.

6. The apparatus as set forth in claim 5, wherein said dimming means includes mechanical means, whereby said sources may be dimmed without changing the color temperature of the illumination produced by said sources when said sources are energized.

7. The apparatus as set forth in claim 5, wherein, said first source includes a first filament and a first envelope surrounding said first filament, said second source includes a second filament and a second envelope surrounding said second filament, and wherein said mechanical dimming means includes a first cylindrically shaped shield for incircling at least a portion of said first envelope, a first mechanism to move said first shield relative to said first envelope, a second cylindrically shaped shield for incircling at least a portion of said second envelope, and a second mechanism to move said second shield relative to said second envelope, whereby, when said shields incircle a portion of said filaments, illumination from the incircled portion of said filaments is prevented from reaching said reflectors.

8. The apparatus as set forth in claim 7, wherein said first mechanism includes a first arm laterally extending from said first shield and having a first bore therein, a first guide pin secured to said housing means and received in said first bore, and a first mechanical linkage secured between said first arm and said housing means for moving said first arm relative to said first guide pin, and wherein said second mechanism includes a second arm laterally extending from said second shield and having a second bore therein, a second guide pin secured to said housing means and received in said second bore, and a second mechanical linkage secured between said second arm and said housing means for moving said second arm relative to said second guide pin.

9. A high intensity light table for transilluminating film comprising:

(a) housing means;

(b) a plano light transmitting surface supported by said housing means; and (c) means for producing in the plane of said light transmitting surface a diffused pair of intersecting annular rings of illumination, said means including (i) first and second intersecting reflectors, each in the form of a section of a paraboloid, positioned within said housing, (ii) first and second sources of high intensity illumination, said first source nominally positioned at the center of focus of said first reflector, said second source nominally positioned at the center of focus of said second reflector whereby, when said sources are energized, said reflectors produce a pair of intersecting annular images of said sources, and (iii) means for diffusing said intersecting annular images, said diffusing means including first and second diffusing cylinders, said first cylinder positioned in the light path between said first source and said first reflector, said second cylinder positioned in the light path between said second source and said second reflector; and (d) means, within said housing means for dimming said sources without changing the color temperature thereof.

10. The apparatus as set forth in claim 9, wherein said first source includes a first filament and a first envelope surrounding said first filament, said second source includes a second filament and a second envelope surrounding said second filament, and wherein said dimming means includes a first cylindrically shaped shield for incircling at least a portion of said first envelope, a first mechanism to move said first shield relative to said first envelope, a second cylindrically shaped shield for incircling at least a portion of said second envelope, and a second mechanism to move said second shield relative to said second envelope, whereby, when said shields incircle a portion of said filaments, illumination from the incircled portion of said filaments is prevented from reaching said reflectors.

11. The apparatus as set forth in claim 9, further including first and second shielding means each in the form of a mirror having a semi-reflective coating, said first shielding means positioned between said first source and said light transmitting surface for reducing the direct radiation on said light transmitting surface from said first source, said second shielding means positioned between said second source and said light transmitting surface for reducing the direct radiation on said light transmitting surface from said second source.

12. The apparatus as set forth in claim 9, further including a third reflector, positioned within said housing means and across the seam formed where said first and second reflectors intersect, to reflect light from one of said first and second sources toward said light transmitting surface.

13. The apparatus as set forth in claim 9, further including means, supported within said housing means, for cooling said sources and said reflectors.

* * * * *